United States Patent [19]

Gosselin

[11] Patent Number: 5,727,793
[45] Date of Patent: Mar. 17, 1998

[54] PACKING BOX FOR FLUID DISPLACEMENT DEVICE

[76] Inventor: Jean Gosselin, 4761 de la Sarcelle, St. Augustin de Desmaures, Quebec, Canada, G3A 2A5

[21] Appl. No.: 571,958
[22] PCT Filed: May 3, 1995
[86] PCT No.: PCT/CA95/00263
  § 371 Date: Feb. 12, 1996
  § 102(e) Date: Feb. 12, 1996
[87] PCT Pub. No.: WO95/30850
  PCT Pub. Date: Nov. 16, 1995

[30] Foreign Application Priority Data

May 4, 1994 [CA] Canada .................. 2148506

[51] Int. Cl.$^6$ .................................... F16J 15/00
[52] U.S. Cl. ..................... 277/105; 277/50; 277/123
[58] Field of Search ........................... 277/36, 47, 50, 277/102, 104, 105, 123

[56] References Cited

U.S. PATENT DOCUMENTS

| | | |
|---|---|---|
| 795,444 | 7/1905 | Kales .................. 277/102 |
| 860,035 | 7/1907 | Kerr . |
| 1,163,941 | 12/1915 | Miller . |
| 1,902,097 | 3/1933 | Penick et al. . |
| 3,351,350 | 11/1967 | Shepler ................ 277/105 |
| 4,330,135 | 5/1982 | Butterfield ............ 277/105 |
| 4,411,438 | 10/1983 | Scobie ................. 277/105 |
| 4,717,160 | 1/1988 | Zitting et al. . |

FOREIGN PATENT DOCUMENTS

| | | |
|---|---|---|
| 0167084 | 1/1906 | Germany ................ 277/36 |
| 3345116 | 6/1984 | Germany . |
| 34154 | 5/1905 | Switzerland . |

*Primary Examiner*—Daniel G. DePumpo
*Attorney, Agent, or Firm*—Birch, Stewart, Kolasch & Birch, LLP

[57] ABSTRACT

A packing box (10) is provided for housing a packing seal (48) between a rotating shaft (32) and the casing (18) of a pump. The packing box (10) comprises walls defining an enclosed chamber for accommodating the packing. An annular plate (36) is provided between the pump housing (18) and the packing (48) in order to compress the packing against the shaft (32) in a direction essentially orthogonal to and away from the pump housing (18).

10 Claims, 3 Drawing Sheets

PACKING BOX FOR FLUID DISPLACEMENT DEVICE

TECHNICAL FIELD

The present invention relates to the sealing of a moving shaft for fluid transfer devices including for example pumps, fans, compressors and agitators. More specifically, the present invention is concerned with a novel packing box configuration.

BACKGROUND ART

In a rotary pump, the shaft projects exteriorly from the pump casing in a zone known as the "packing box" or "stuffing box". These terms were derived from the notion that in order to separate the fluid contained in the casing from the outside environment, some material had to be stuffed or packed around the shaft where it passed through the casing. For example, a common type of rotating shaft seal consists of natural or synthetic fibres or strands which are woven or braided into coils, spirals or die-formed rings. To ensure initial lubrication, the packing material are usually impregnated with a lubricant.

The packing, in order to create an efficient seal, is deformed by compression to reduce any gaps between the shaft and the packing. This compression of the packing generates friction with the shaft, resulting in heat on the shaft.

The traditional packing box design comprises a housing mounted around the shaft and a gland follower. The packing is installed inside the chamber and is deformed by the gland follower against a bushing in the chamber. The more the gland follower is pressed towards the interior of the packing chambers the more the packing rings will be compressed. One main drawback with such a design is that most of the packing compression is applied on the packing rings located farthest away from the casing. Consequently, the greatest friction and thus heat generation is applied on the shaft at some distance from the shaft/casing interface.

To help control heat, a device commonly knows as "lantern ring" is used in conjunction with the packing. It consists of a metal or plastic ring placed between groups of packing rings and around the shaft. Cooling or lubricating fluids are introduced to the packing by way of the lantern ring. When this cooling fluid is fed under pressure it can also counteract fluid pressure coming from the casing at the shaft/casing interface.

It is common to use fresh cooling water as a cooling fluid. One important drawback of such cooling systems is the voluminous consumption of fresh water. Another drawback occurs when the fluid inside the casing is to be maintained at an elevated temperature. Indeed, the cooling water used in the lantern ring will tend to lower the temperature of the fluid inside the casing. Furthermore, in many instances such as in the pulp and paper or traditional chemical industries, the cooling water may be contaminated by the fluid leaking from the casing and it will be required to be recycled or otherwise decontaminated. In a pulp and paper environment, solids from the pump will also infiltrate the packing box, further inducing the efficiency of the packing box.

It is an object of the present invention to provide a packing box design where the packing is compressed from the zone closest to the casing. Thus an annular plate or follower may be provided about the shaft closest to the casing/shaft interface and the annular plate would be pressed away from the casing/shaft interface such as to compress the packing rings in the zone closest to the casing/shaft interface so that it is the first rings that create the seal. Thus the heat may be dissipated by the fluid from the pump.

Although none of the prior art appears to recognize the advantages of compressing the packing rings in the packing box closest to the shaft casing interface, certain patents appear to, at least on the face of it, have a similar construction.

Swiss Patent 34154 which issued to Franz Kales May 20, 1905 shows a conventional packing box with gland followers D pressing against the exterior of the packing rings. However, there is shown an annular plate B which could be drawn outwardly from an inner position near the interface of the casing with the shaft. The plate B is drawn by puller rods C being tightened by nuts H. The rods C pass through the packing, thereby creating further leakage problems.

U.S. Pat. No. 860,035 Kerr was issued Jul. 16, 1907. In the Kerr Patent an inner plate 11 is illustrated in conjunction with puller rods 14. However, the structure in Kerr is distinguished by applying pressure on the packings on both sides of the bearing 3. In other words when the rods 14 are tightened by nuts 15 both the gland follower 13 and the annular plate 11 are moved simultaneously towards the center. Some sealing would occur adjacent the follower 10 but there is plenty of gaps surrounding the plate 11 and the follower 10 to allow solids for instance to infiltrate the packings.

DISCLOSURE OF THE INVENTION

It is an aim of the present invention to provide a packing box with an improved seal between the shaft and the casing in order to eliminate the need for a fresh water cooling system utilizing a lantern ring, and thus conserving water.

It is a further aim of the present invention to provide a packing box wherein the packing rings closest to the interface between the shaft and the casing will be compressed first forming a seal, and whereby pressure providing this compression will be provided by the fluid pressure from the casing.

It is a further aim of the present invention to provide an improved packing compression structure for a packing box.

A construction in accordance with the present invention comprises a packing box adapted to be mounted on a casing for a fluid displacement device wherein the packing box has walls defining a cylindrical closed chamber surrounding the shaft at the interface between the casing and the shaft, an annular packing means surrounding the shaft, an annular follower slidable on the shaft and having a periphery conforming to the cross-section of the walls forming the cylindrical chamber, and seal means along the periphery of the follower ring and in sealing contact with the walls such that pressure applied to the follower to move the follower away from the interface will cause the packing closest to the interface to be compressed against the shaft, whereby a fluid seal with the shaft is formed.

One embodiment of the invention provides a packing box for forming a packing seal between a movable shaft and the casing of a fluid transfer device, the packing box comprising a housing, means for mounting the housing to the casing; the housing having walls defining a cylindrical chamber with a central tubular portion adapted to receive the shaft and being parallel thereto, a slidable follower movable on the shaft and a packing surrounding the shaft; the cylindrical chamber comprising at least two diametrically opposed longitudinal side tubular portions communicating with the central tubular portion, each side tubular portion adapted to accommodate a stem, and each stem being fixedly connected to the follower in generally orthogonal relation to the follower, each stem extends in a direction away from the casing and traverses the packing box through corresponding openings in an end wall of the housing. Puller means are provided on the exterior of the end wall for pulling each stem whereby the follower can be drawn towards the end wall, away from the casing to compress the packing closest to the casing.

Other features and advantages of the invention will become apparent to those of ordinary skill in the art upon review of the following detailed description, claims, and drawings.

MODE FOR CARRYING OUT THE INVENTION

Figure 1:
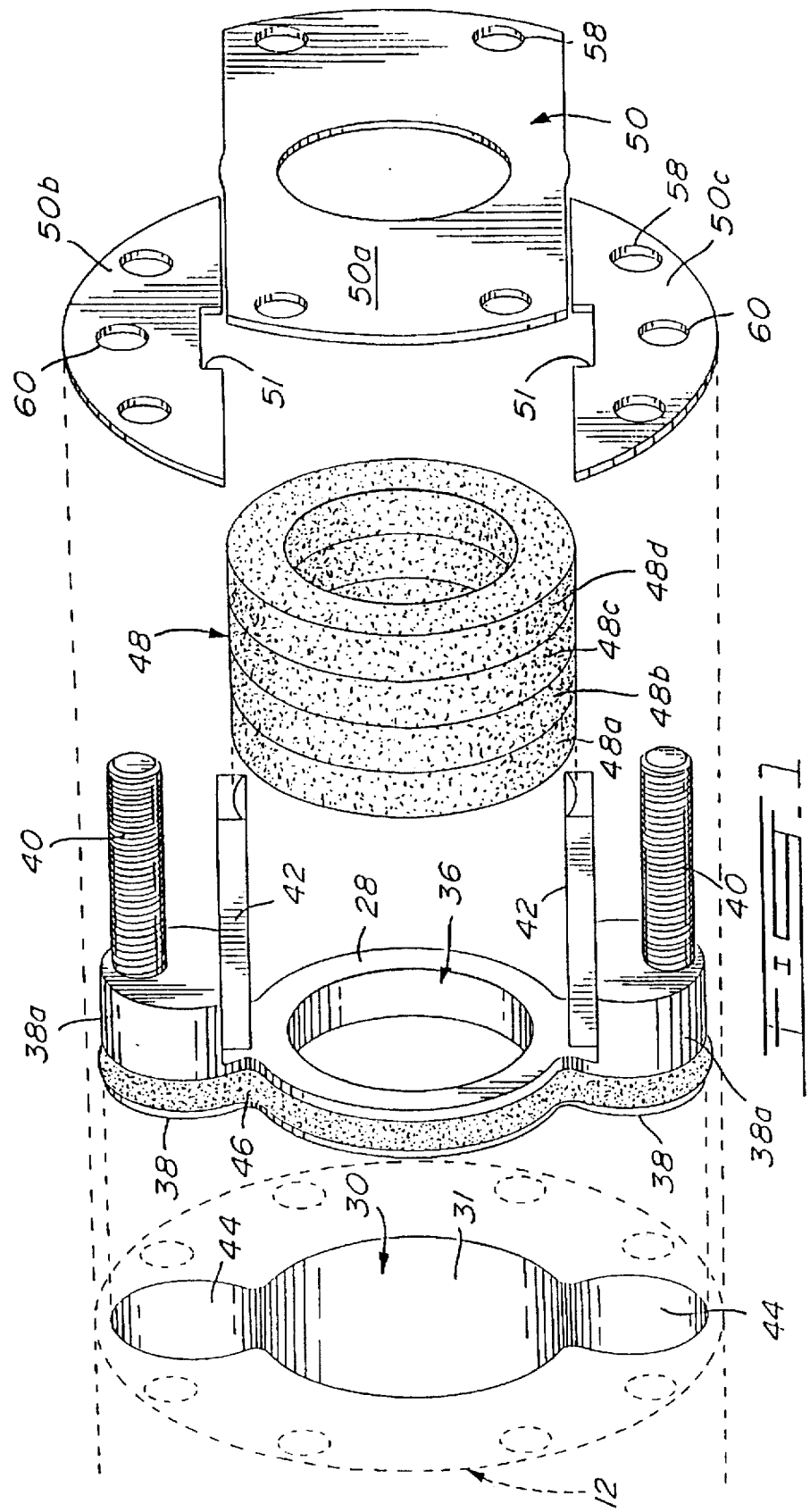
FIG. 1 is an exploded perspective view of a preferred embodiment of the main components of the stuffing box of the present invention.

Packing box 10 has a housing 12 and a flange 14. Flange 14 has circumferentially spaced holes 16 to accommodate bolts 22 for mounting the packing box 10 on the pump casing 18 (shown in FIG. 2). A suitable leak proof seal such as O-ring 20 is used at the interface between flange 14 and the pump casing 18. The bolts 22 can press flange 14 against the seal 20 on casing 18.

Housing 12 includes a smooth inner wall defining a cylindrical chamber 30 including a tubular central bore 31 to accommodate circular cylindrical shaft 32 provided with a shaft sleeve 34. A follower ring 36 slides on shaft sleeve 34. Follower ring 36 has a central circular annular portion 28 and ears 38. Ear portions 38 each have threaded stems 40 projecting orthogonally therefrom.

The follower ring 36, including central portion 28 and ears 38, is designed to fit snugly in the cylindrical chamber 30 having a central bore 31 and side bores 44.

The Applicant refers in this description and the claims to the term "cylinder" to mean a surface traced by a straight line moving parallel to a fixed straight line and intersecting a fixed curve. Thus, the irregular shape of chamber 30 is a cylinder. The central bore 31 has a circular cross-section as do the smaller side bores 44, although these side bores 44 communicate with the central bore 31.

The follower ring 36, has a configuration similar to the cylindrical chamber 30 as has already been described and O ring seal 46 extends continuously about the periphery of the ring 36 and is in sealing contact with the cylindrical surface of the chamber 30.

The O ring 46 may be made of rubber or graphite. Suitable O rings are available under the Trademark VITON and the Trademark AFLAS.

The ears 38 of ring 36 are provided with an orthogonal extension 38a to which the stems 40 are connected. Likewise, gates 42 are connected respectively to the portions 38a of the ears 38. These gates 42 are bolted thereto by means of screw 45. The gates 42 are shaped so as to separate the central bore 31 of cylindrical chamber 30 from the smaller side bores 44. Thus, the packing 48 will not expand into the bores 44 when pressure is placed on the packing rings 48 since the gates 42 will block the expansion into the bores 44. The gates 42 also maintain the attitude of follower ring 36, so that the ring will remain orthogonal to the shaft 32, thus preventing the ring 36 from biding on the shaft 32 as it is slid on the shaft 32.

Circular packing rings forming the packings 48 are located on the shaft liner 34. The ring 48a will be the closest to the interface between the shaft 32 and the casing 18. The packing ring 48a is also adjacent the follower ring 36. The other packing rings 48b, 48c, and 48d, follow in succession towards the exterior of the packing box.

Figure 2:
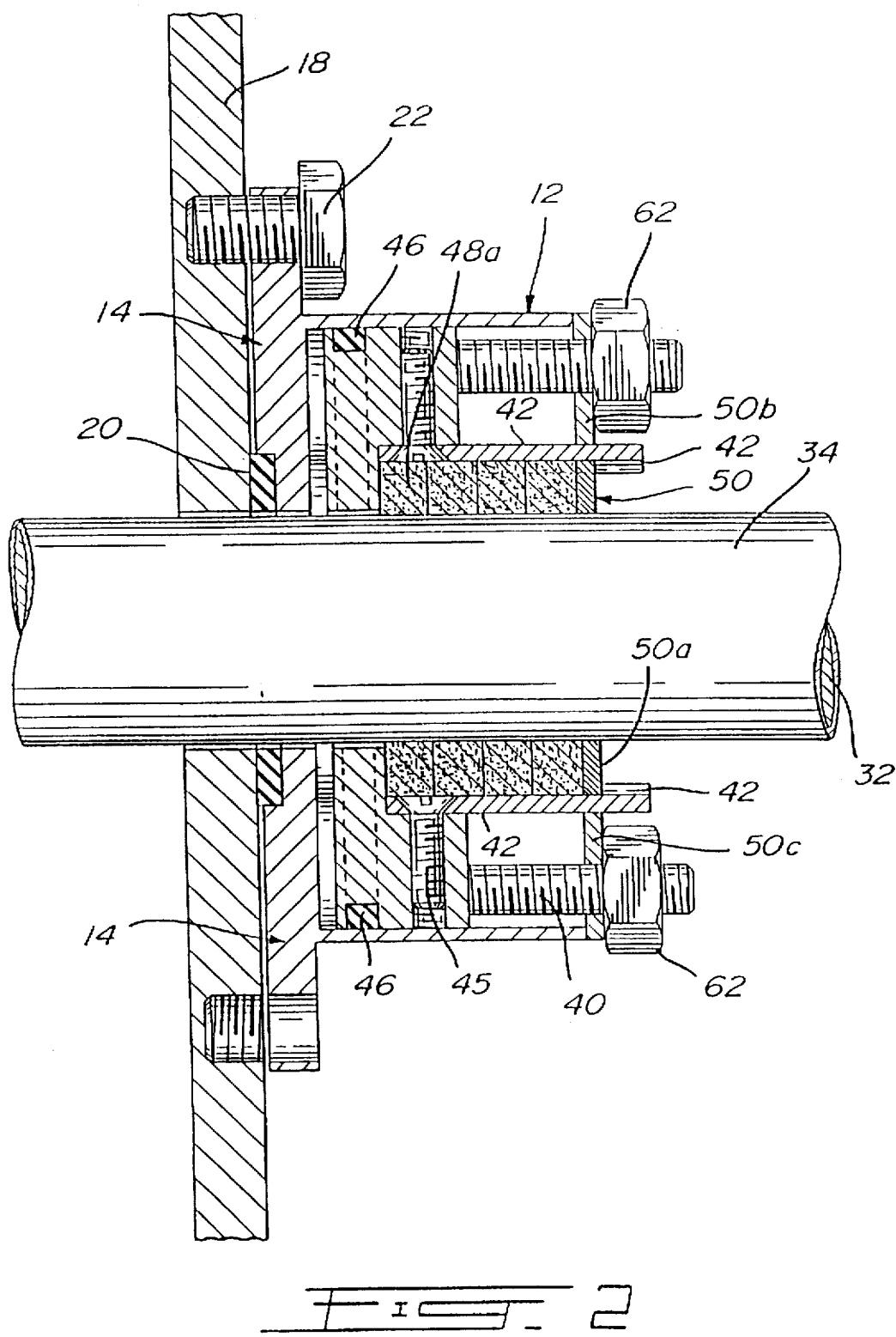
FIG. 2 is an axial cross-section taken along line 2—2 of FIG. 3.
Figure 3:
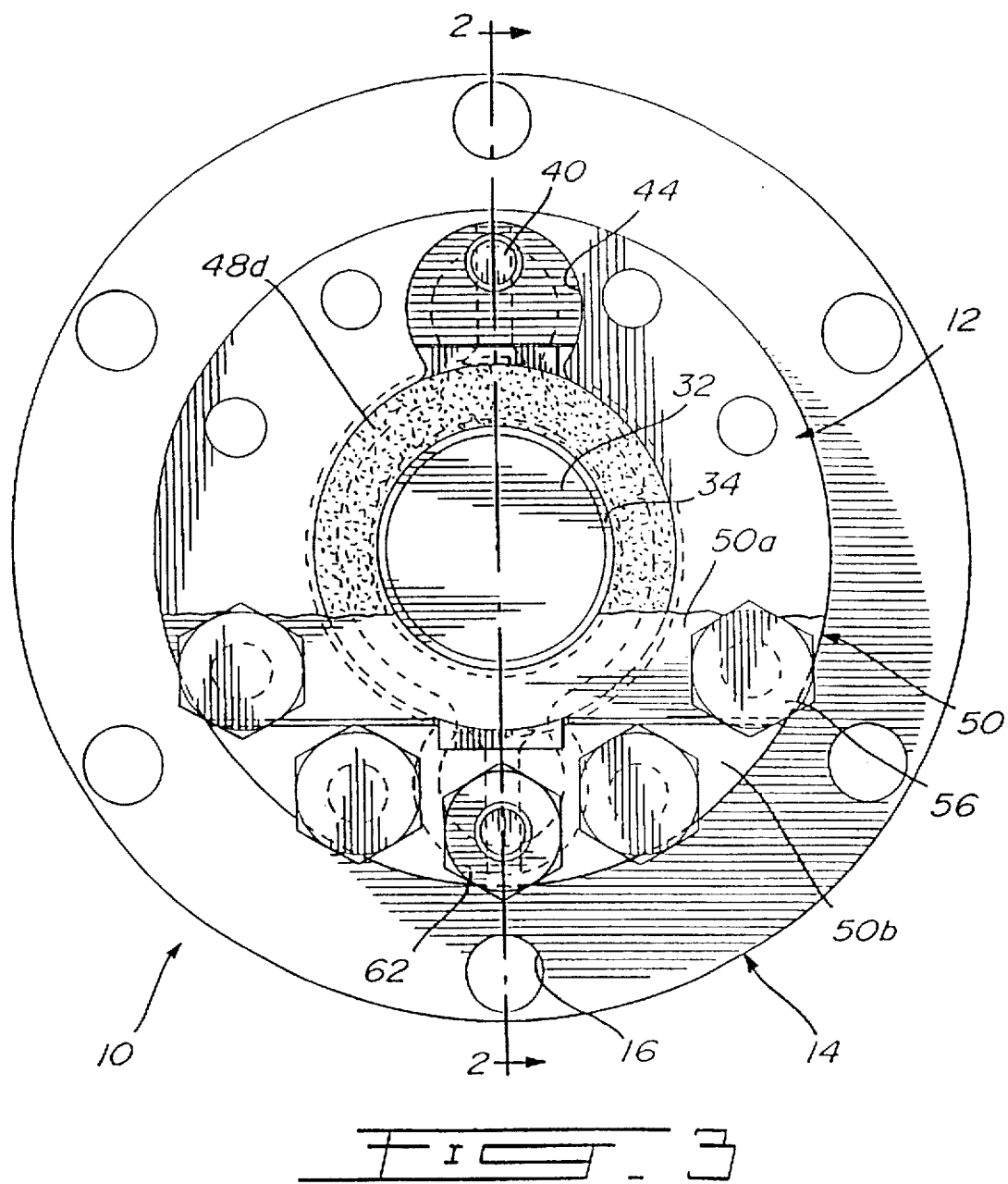
FIG. 3 is a fragmentary end view of the embodiment shown in FIG. 1.

An end wall plate 50 is provided to close the packing box 10. End wall plate 50 is made up of a central end wall plate portion 50a and plate portions 50b and 50c. The end wall plate portions 50a and 50b include cut outs 51 to accommodate the gates 42 which slide therethrough. The end wall plate portions 50a, 50b, and 50c are provided with apertures 58 to accommodate bolts 56. Openings 60 in plate portions 50b and 50c accommodate the stems 40. As can be seen in FIG. 2, the threaded stems 40 extend through the opening 60 and nuts 62 are provided to pull the stems 40 through the end wall plate 50.

Thus, in operation, when it is required to deform the packings and to create a seal between the casing 18 and the shaft sleeve 34, the stems 40 are pulled by tightening nuts 62, thereby drawing the follower ring 36. Follower ring 36 presses against the packing ring 48a, thereby deforming the first packing ring closest to the casing. A seal is thus formed between the shaft and the housing of the packing box closest to the interface between the casing 18 and the shaft 32. Since the ring 48a is close to the casing 18 it is expected that fluid escaping through the interface will cool the ring 48a, thereby eliminating the necessity of having a lantern ring. Since the follower ring 36 is sealed against the wall surface of the cylindrical chamber 30, fluid will not pass beyond the follower ring 36. Although there is a gap between the follower ring 36 and the shaft 32, the first packing 48a will create a seal to reduce leakage of the fluid beyond the packings 48.

During installation, once the packing box 10 is bolted to the casing 18 of the pump, packing follower ring 36 is slid into cylindrical chamber 30 on the shaft sleeve 34. Packing rings 48a, 48b, . . . , are then slid onto shaft sleeve 34. The components of cover plate 50 are then bolted to the housing 12 to complete the packing box 10. Progressive tightening of nuts 62 will result in progressive compression of the packing 48 starting with packing ring 48a.

Another related advantage is that this arrangement generally results in diminished requirements in the numbers of rows of packing 48 which are necessary to appropriately seal shaft 32 and shaft sleeve 34 from the environment outside the fluid displacement device. Those skilled in the art will also perceive numerous other advantages which result from the present invention.

For example, in conventional packing box designs, the periodic removal and replacement of packing is an arduous task. The packing, which in operation, is compressed by a gland follower has to be pulled out after a certain period of time, either to replace the packing or for maintenance. Operators commonly use hooks or corkscrew tools to extricate the packing. Sometimes the packing comes out in pieces and it takes much effort to remove all of it before installing fresh packing. In the packing box design of the present invention, the removal of the packing 48 is greatly facilitated. Central end wall plate 50a of the cover plate assembly 50 is removed and as nuts 62 are tightened, the packing 48 is pushed out from the chamber ring by ring.

It is contemplated that follower ring 36 will compress the packing rings 48a, and 48b, in reaction to the pressure from the fluid entering the packing box 10 from the housing 18. Thus, slight adjustments in the compression of the packing can occur without having to tighten the nuts 62 at every occurrence. In other words, if the packing ring 48a is prematurely exhausted and there is no further force applied thereto from the follower ring 36, the internal pressure of the fluid from the housing 18 would advance the follower ring 36 to take up the slack and in fact apply further pressure on the compression rings 48a and 48b. Thus, maintenance of the packing box may not have to be as frequent since slight adjustments will automatically occur. At some point, however, the nuts 62 must be tightened in order to pull the follower rings a greater distance to compress the packings 48.

Although the invention has been described above with respect with one specific form, it will be evident to a person skilled in the art that it may be modified and refined in various ways. It is therefore wished to have it understood that the present invention should not be limited in scope, except by the terms of the following claims.

I claim:

1. A packing box adapted to be mounted on a casing for a fluid displacement device and including a movable shaft projecting from the casing, the packing box comprising a housing, means for mounting the housing to the casing, said housing having a wall surface defining a cylindrical chamber with a central tubular portion adapted to receive the shaft extending therethrough, the housing wall surface being parallel to the shaft, an annular packing means surrounding the shaft, an annular follower ring slidable on the shaft and having a periphery conforming to the cross-section of the wall surface forming the cylindrical chamber, a flexible seal member provided on the periphery of the follower ring in sealing contact with the wall surface, at least a pair of stems being fixedly connected to the follower ring in generally orthogonal relation puller means provided exterior of the housing for pulling the stems to move the follower ring away from the casing causing the packing closest to the casing to be compressed against the shaft creating a fluid seal with the shaft.

2. A packing box for providing a packing seal between a movable shaft means and the casing of a fluid transfer device, the packing box comprising a housing, means for mounting the housing to the casing, said housing having a wall surface defining a cylindrical chamber with a central tubular portion adapted to receive the shaft extending therethrough, the housing wall surface being parallel to the shaft, a slidable follower ring movable on the shaft, a packing surrounding the shaft, the cylindrical chamber comprising at least two diametrically opposed, longitudinal, side tubular portions communicating with the central tubular portion, at least two stems being fixedly connected to the follower ring in generally orthogonal relation, each side tubular portion adapted to accommodate one of the at least two stems, each stem extends in a direction away from the casing and traverses the packing box through an end wall of the housing, and puller means are provided on the exterior of the end wall for pulling each stem, whereby the follower ring can be drawn towards the end wall away from the casing to compress the packing closest to the casing.

3. A packing box as defined in claim 2, wherein a sealing means extends continuously on the periphery of the follower and is in sealing contact with the housing wall surface defining the cylindrical chamber.

4. A packing box as defined in claim 2, wherein diametrically opposed gates extend from the follower ring parallel to the shaft in the direction of the end wall, wherein the gates coincide with the opening between the side tubular portions and the central tubular portion of the cylindrical chamber so as to prevent the packing from expanding into the side tubular portions.

5. A packing box as defined in claim 4, wherein the gates project through the end wall of the packing box when the follower is drawn towards the end wall.

6. A packing box as defined in claim 2, wherein the end plate is made up of three segments with a central segment having a width at least the diameter of the packings, whereby the packings may be removed for replacement.

7. A packing box as defined in claim 2, wherein the stems are threaded and the puller means are on the threaded stems exterior of the packing box.

8. A packing box as defined in claim 3, wherein diametrically opposed gates extend from the follower ring parallel to the shaft in the direction of the end wall, wherein the gates coincide with the opening between the side tubular portions and the central tubular portion of the cylindrical chamber so as to prevent the packing from expanding into the side tubular portions.

9. A kit of parts for forming a packing box assembly for providing a packing seal between a movable shaft means and the casing of a fluid transfer device; the kit comprising: a housing defining a cylindrical chamber having a central tubular portion adapted to receive said shaft extending therethrough, flange means for mounting said housing on said casing; a slidable follower ring placed over the shaft and packing also placed over the shaft on a side of said follower ring remote from said casing, said cylindrical chamber additionally comprising at least two longitudinal tubular side portions communicating with said central tubular portion, at least a pair of stems being fixedly connected to said slidable follower ring in generally orthogonal relation to said slidable follower ring, each at least two stems extending in a respective side chamber in a direction away from the casing and traversing said packing box through corresponding openings in said packing box, each stem being adapted to be pulled by a corresponding puller means placed outside said packing box.

10. A method of providing a seal between the casing of a fluid displacement device and a movable shaft, including the steps of providing a packing box at the interface between the casing and the shaft wherein the packing box has a housing defining a cylindrical chamber surrounding and parallel to the shaft and the cylindrical chamber being closed by an end wall; locating a follower ring within the chamber surrounding the shaft, providing a continuous seal about the periphery of the follower ring in sealing contact with the wall surface of the cylindrical chamber, providing a packing about the shaft between the follower ring and the end wall whereby fluid pressure from the casing will move the follower ring away from the interface to cause the packing closest to the interface to be compressed against the shaft to create a fluid seal with the shaft; and characterized by stems extending from the follower ring in an area of the cylindrical chamber remote from the packings and through the end wall, pulling the stems from the exterior of the packing box to compress the follower ring against the packing to create the seal; and wherein the end wall is segmented and a central segment of the end wall has a width at least the diameter of the packing and the central segment can be removed independently of the side segments of the end wall and the stems pass through the side segments of the end wall such that when it is necessary to move the packing the central segment is first removed and then the stems are pulled through the end wall, whereby the follower ring will push the packing through the opening where the central segment of the end wall has been removed.

* * * * *